United States Patent
Kozel

[11] Patent Number: 5,328,305
[45] Date of Patent: Jul. 12, 1994

[54] OFFSET DRIVE COUNTERSINK APPARATUS

[76] Inventor: Robert J. Kozel, 76 Elm St., Upton, Mass. 05168

[21] Appl. No.: 96,302

[22] Filed: Jul. 26, 1993

[51] Int. Cl.⁵ .......................................... B23B 47/02
[52] U.S. Cl. .................................... 408/124; 409/144
[58] Field of Search ............... 408/79, 124, 125, 128; 409/144

[56] References Cited

U.S. PATENT DOCUMENTS

| | | | |
|---|---|---|---|
| 2,368,786 | 2/1945 | Sherman | 408/16 |
| 2,752,664 | 7/1956 | Brown | 408/124 |
| 2,899,867 | 8/1959 | Brayack | 408/124 |
| 3,162,091 | 12/1964 | Keller | 408/128 |
| 3,164,063 | 1/1965 | Sherman | 409/144 |
| 3,263,570 | 8/1966 | Heffron et al. | 409/144 |
| 5,236,359 | 8/1993 | Myers et al. | 408/128 |

FOREIGN PATENT DOCUMENTS 1568607  6/1980  United Kingdom ............... 408/124

*Primary Examiner*—Daniel W. Howell

[57] ABSTRACT

A new and improved offset drive countersink apparatus is provided for connection to a rotary drive source and includes a first driven rotating member connected to the rotary drive source. The first driven rotating member rotates around a first longitudinal axis. A first gear is connected to the first driven rotating member, is driven thereby, and rotates around the first longitudinal axis. The first gear lies in a first plane. A second gear meshes with the first gear and also lies in the first plane. The second gear rotates around a second longitudinal axis. The first longitudinal axis and the second longitudinal axis are offset from each other by a predetermined offset distance in the first plane. A housing receives the first gear and the second gear and supports the first gear and the second gear in the first plane. A countersink tool is connected to the second gear. The countersink tool is driven by the second gear and rotates around the second longitudinal axis at the predetermined offset distance offset from the first driven rotating member. The housing includes a bottom planar portion and a top planar portion that house and support the first gear and the second gear in the first plane. The housing also includes alignment apertures for keeping the first driven rotating member and the first gear in alignment and for keeping the second gear and the countersink tool in alignment.

9 Claims, 4 Drawing Sheets

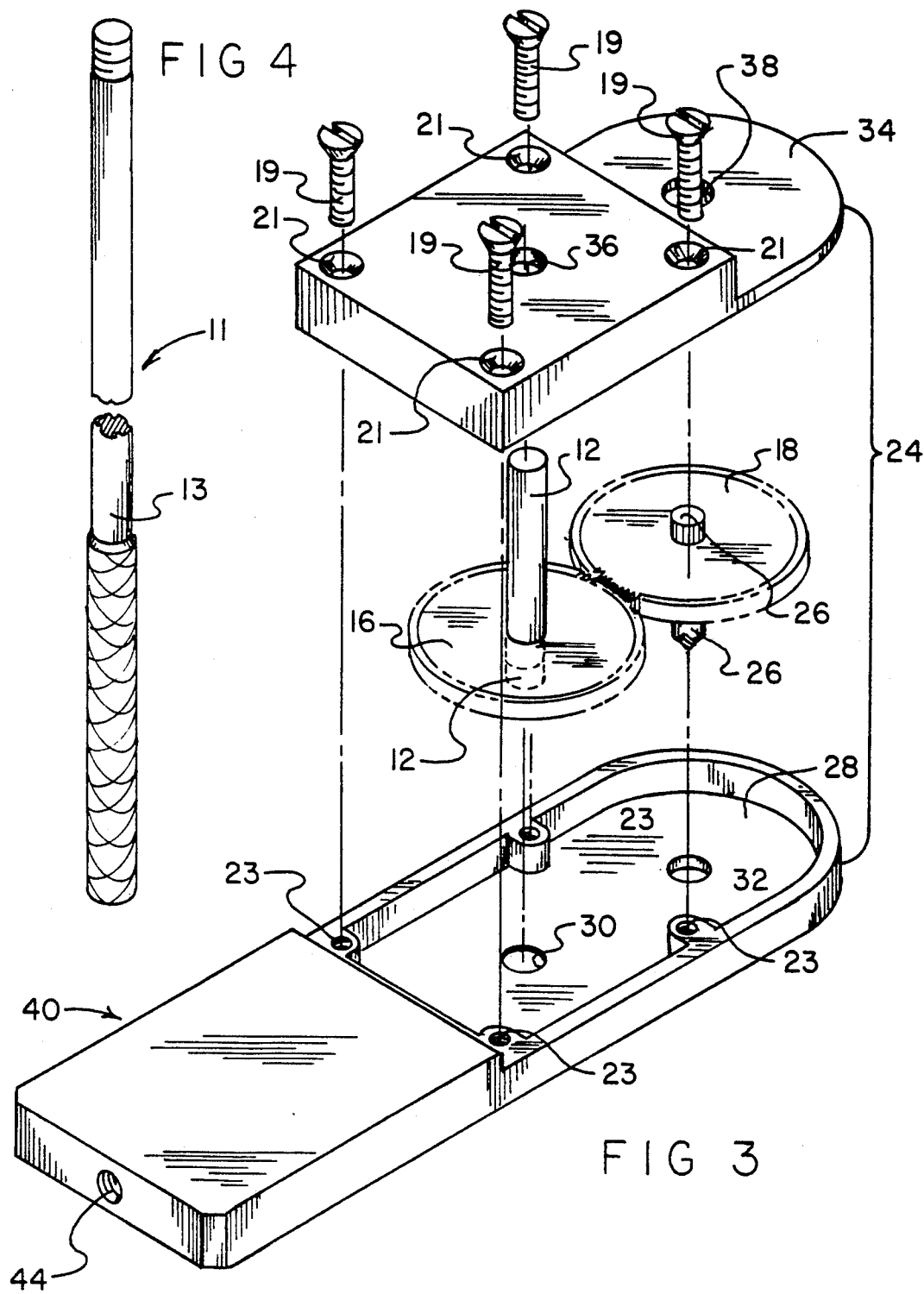

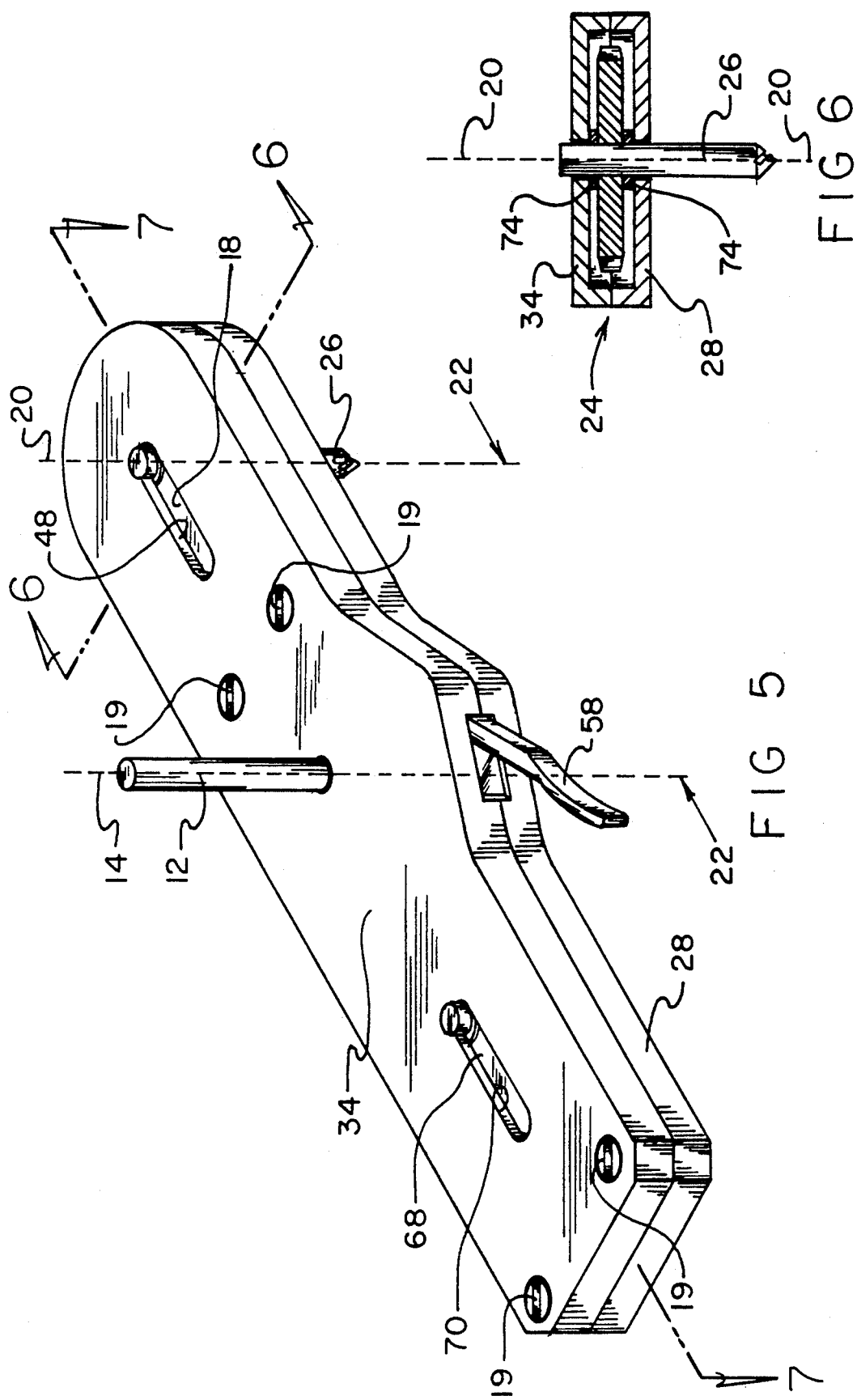

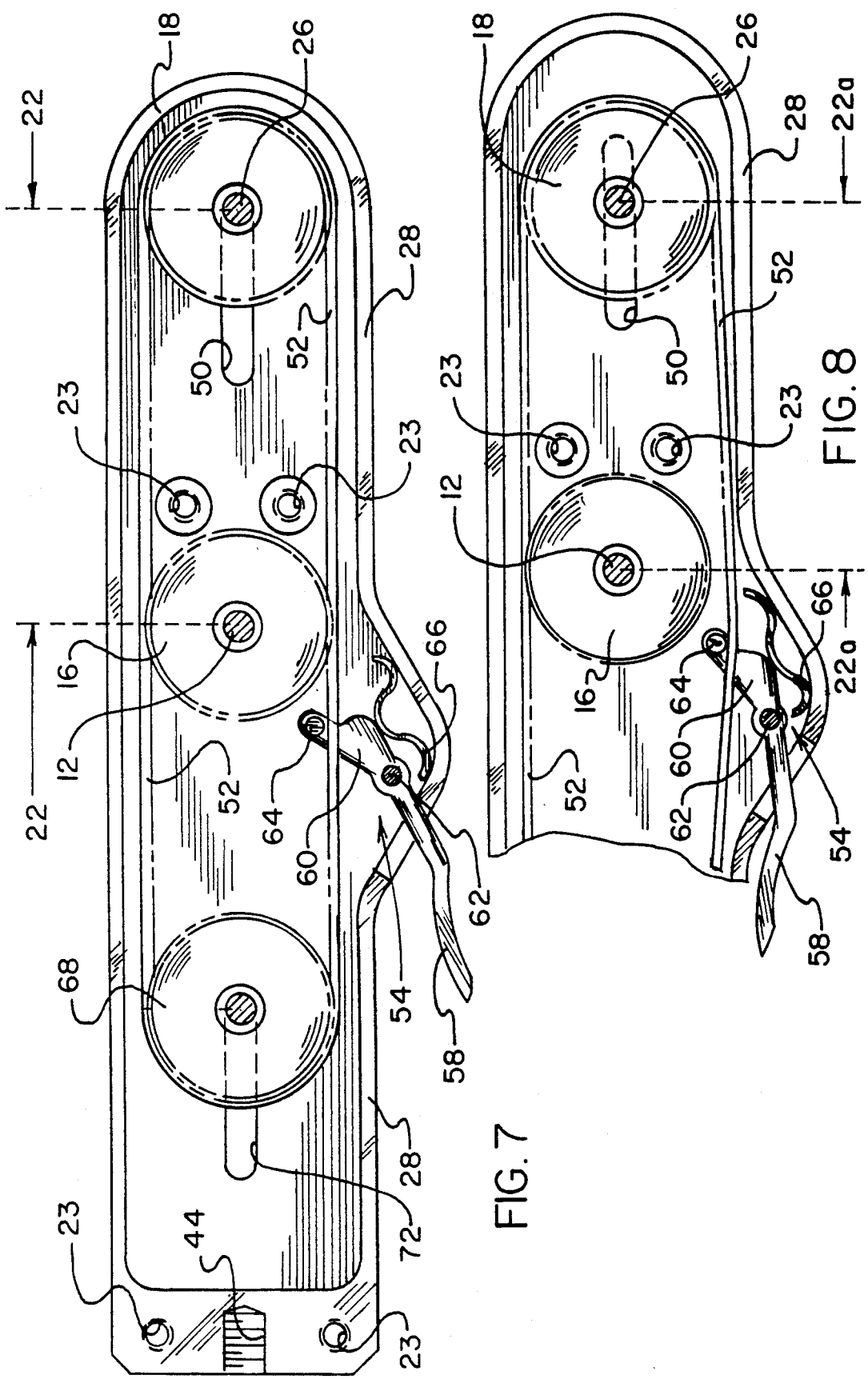

OFFSET DRIVE COUNTERSINK APPARATUS

BACKGROUND OF THE INVENTION

1. Field of the Invention

The present invention relates generally to devices for cutting a desired formation into a workpiece, and more particularly, to a device for cutting a countersink into a workpiece.

2. Description of the Prior Art

Devices for cutting a countersink into a workpiece are well known in the machining arts. The following U.S. patents are representative of devices employed in cutting countersinks: U.S. Pat. Nos. 3,439,566; 4,032,251; 4,897,000; 4,950,109; and 5,066,172. All of the above-cited patents have one common characteristic. The rotating countersink cutting tool and the means for rotating the countersink cutting tool rotate around the same longitudinal axis.

There are workpieces, however, for which having both the rotating countersink cutting tool and the means for rotating the countersink cutting tool on the same longitudinal axis would make it difficult, if not impossible, to cut a countersink in the workpiece. Such a workpiece may be bulky and have desired countersink locations distributed in a manner such that a desired location for a countersink cannot be placed under the rotating means for driving the countersink tool. In this respect, it would be desirable if a countersink cutting device were provided that which did not require the countersink tool to rotate around the same longitudinal axis that the countersink tool driving device rotates around. Stated somewhat differently, it would be desirable if a countersink cutting device were provided that included a countersink tool that rotates around a longitudinal axis that is offset from the longitudinal axis that the countersink driving tool rotates around.

For precision cutting and for best cutting control, it is desirable that the vertical distance between the countersink driving tool and the countersink cutting tool be kept to a minimum. In this respect, it would be desirable if an offset countersink cutting device were provided in which the vertical distance between the countersink driving tool and the countersink cutting tool is relatively small.

With a conventional countersink cutting device, it is important that the countersink driving tool and the countersink cutting tool be kept in proper alignment. The same can be said for an offset countersink cutting device. In this respect, it would be desirable if an offset countersink cutting device were provided that included provisions for maintaining proper alignment between the countersink driving tool and the offset countersink cutting tool.

When a workpiece is subjected to the rotational cutting of a rotating countersink cutting tool, there is an interplay of forces, and there is a tendency to destabilize the alignment between the countersink driving tool, the countersink cutting tool, and the workpiece. The tendency to destabilize the alignment between the countersink driving tool, the countersink cutting tool, and the workpiece may be aggravated when the countersink cutting tool and the workpiece are offset from the countersink driving tool. In this respect, it would be desirable if an offset countersink cutting device were provided that had provisions for stabilizing the alignment between the countersink driving tool, the countersink cutting tool, and the workpiece.

Workpieces vary quite a bit as to their respective sizes and their respective countersink requirements. In this respect, an offset countersink device that has an unchangeable offset setting may, at times, be undesirably limiting. In this respect, it would be desirable if an offset countersink cutting device were provided that had an adjustable offset.

After a certain amount of use, a countersink cutting tool will wear out. As such, it must be replaced. In this respect, it would be desirable if an offset countersink cutting device were provided that had an easily replaced countersink cutting tool.

Thus, while the foregoing body of prior art indicates it to be well known to use devices for cutting countersinks in a workpiece, the prior art described above does not teach or suggest a offset drive countersink apparatus which has the following combination of desirable features: (1) does not require the countersink tool to rotate around the same longitudinal axis that the countersink tool driving device rotates around; (2) includes a countersink tool that rotates around a longitudinal axis that is offset from the longitudinal axis that the countersink driving tool rotates around; (3) includes a countersink apparatus in which the vertical distance between the countersink driving tool and the countersink cutting tool is relatively small; (4) includes provisions for maintaining proper alignment between the countersink driving tool and the offset countersink cutting tool; (5) has provisions for stabilizing the alignment between the countersink driving tool, the countersink cutting tool, and the workpiece; (6) provides an offset countersink cutting device that has an adjustable offset; and (7) provides an offset countersink cutting device that has an easily replaced countersink cutting tool. The foregoing desired characteristics are provided by the unique offset drive countersink apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved offset drive countersink apparatus for connection to a rotary drive source. The apparatus is comprised of a first driven rotating member connected to the rotary drive source. The first driven rotating member rotates around a first longitudinal axis. A first gear is connected to the first driven rotating member. The first gear is driven by the first driven rotating member and rotates around the first longitudinal axis. The first gear lies in a first plane. A second gear meshes with the first gear. The second gear is driven by the first gear and also lies in the first plane. The second gear rotates around a second longitudinal axis. The first longitudinal axis and the second longitudinal axis are offset from each other by a predetermined offset distance in the first plane.

A housing receives the first gear and the second gear and supports the first gear and the second gear in the first plane. A countersink tool is connected to the second gear. The countersink tool is driven by the second gear and rotates around the second longitudinal axis at the predetermined offset distance offset from the first driven rotating member. The housing includes a bottom planar portion that supports the first gear and the second gear in the first plane. The bottom planar portion of the housing includes a first bottom alignment aperture for receiving a portion of the first driven rotating member and a second bottom alignment aperture for receiving a portion of the countersink tool. The second bottom alignment aperture is offset from the first bottom alignment aperture by the predetermined offset distance.

The housing also includes a top planar portion that fits over the first gear and the second gear located in the first plane. The top planar portion includes a first top alignment aperture for receiving a portion of the first driven rotating member, a second top alignment aperture for receiving a portion of the countersink tool. The second top alignment aperture is offset from the first top alignment aperture by the predetermined offset distance.

The following elements are in alignment when the top planar portion is placed upon the bottom planar portion with the first gear and the second gear retained in the first plane within the housing: the first driven rotating member, the first gear, the first top alignment aperture, the first gear, and the first bottom alignment aperture.

In addition, the following elements are also in alignment when the top planar portion is placed upon the bottom planar portion with the first gear and the second gear retained in the first plane within the housing: the second top alignment aperture, the countersink tool, the second gear, and the second bottom alignment aperture.

A stabilizer is connected to the housing for stabilizing the alignment between the first driven rotating member, the countersink tool, and a workpiece. The stabilizer includes an extension portion extending laterally from a side of the housing. The stabilizer also includes a tapped well, located in the extension portion, for connecting with a stabilizing fixture extraneous to the extension portion.

An offset adjustment assembly for variably adjusting the predetermined offset distance between the first driven rotating member and the countersink tool. The offset adjustment assembly includes a first adjustment slot located in the top planar portion of the housing. The first adjustment slot encompasses a respective portion of the countersink tool. A second adjustment slot is located in the bottom planar portion of the housing. The second adjustment slot encompasses a respective portion of the countersink tool. The first adjustment slot and the second adjustment slot are in registration when the top planar portion of the housing is connected to the bottom planar portion of the housing.

A flexible drive member, e.g. a chain, is connected between the first gear and the second gear, such that the first gear drives the second gear through the flexible drive member. A manually operated flexible-drive-member-tensioning assembly is connected to the housing for selectively adjusting tension on the flexible drive member, such that by increasing tension on the flexible drive member, respective portions of the countersink tool move toward the first driven rotating member inside the respective first adjustment slot and the respective second adjustment slot, such that the predetermined offset distance between the first driven rotating member and the countersink tool is decreased, and such that by decreasing tension on the flexible drive member, respective portions of the countersink tool move away from the first driven rotating member inside the respective first adjustment slot and the respective second adjustment slot, such that the predetermined offset distance between the first driven rotating member and the countersink tool is increased.

The flexible-drive-member-tensioning assembly includes a lever which includes a manual adjustment arm and a tensioning arm. The flexible-drive-member-tensioning assembly also includes a pivoted fulcrum for the lever. The pivoted fulcrum divides the lever into the manual adjustment arm and the tensioning arm. The pivoted fulcrum is connected to the housing. A tension exerting element is connected to the tensioning arm for exerting tension on the flexible drive member. A locking element, located on the housing, is used for locking the lever into a manually selected tensioning position.

An idler gear is located in the housing and resides in the first plane. The idler gear is driven by the flexible drive member. The idler gear is located distal to the first gear and the second gear. A third adjustment slot is located in the top planar portion of the housing. The third adjustment slot encompasses a respective portion of the countersink tool. A fourth adjustment slot is located in the bottom planar portion of the housing. The fourth adjustment slot encompasses a respective portion of the countersink tool. The third adjustment slot and the fourth adjustment slot are in registration when the top planar portion of the housing is connected to the bottom planar portion of the housing. The countersink tool is connected to the second gear with bearings.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved offset drive countersink apparatus which has all of the advantages of the prior art and none of the disadvantages.

It is another object of the present invention to provide a new and improved offset drive countersink apparatus which may be easily and efficiently manufactured and marketed.

It is a further object of the present invention to provide a new and improved offset drive countersink apparatus which is of durable and reliable construction.

An even further object of the present invention is to provide a new and improved offset drive countersink apparatus which is susceptible of a low cost of manufacture with regard to both materials and labor, and which accordingly is then susceptible of low prices of sale to the consuming public, thereby making such offset drive countersink apparatus available to the buying public.

Still yet a further object of the present invention is to provide a new and improved offset drive countersink apparatus which does not require the countersink tool to rotate around the same longitudinal axis that the countersink tool driving device rotates around.

Still another object of the present invention is to provide a new and improved offset drive countersink apparatus that includes a countersink tool that rotates around a longitudinal axis that is offset from the longitudinal axis that the countersink driving tool rotates around.

Yet another object of the present invention is to provide a new and improved offset drive countersink apparatus which includes a countersink apparatus in which the vertical distance between the countersink driving tool and the countersink cutting tool is relatively small.

Even another object of the present invention is to provide a new and improved offset drive countersink apparatus that includes provisions for maintaining proper alignment between the countersink driving tool and the offset countersink cutting tool.

Still a further object of the present invention is to provide a new and improved offset drive countersink apparatus which has provisions for stabilizing the alignment between the countersink driving tool, the countersink cutting tool, and the workpiece.

Yet another object of the present invention is to provide a new and improved offset drive countersink apparatus that provides an offset countersink cutting device that has an adjustable offset.

Still another object of the present invention is to provide a new and improved offset drive countersink apparatus which provides an offset countersink cutting device that has an easily replaced countersink cutting tool.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is an exploded perspective view of the offset drive countersink apparatus of FIG. 1.

FIG. 4 is a perspective view of a drive shaft for driving the offset drive countersink apparatus shown in FIG. 1.

FIG. 5 is a perspective view of a second preferred embodiment of the invention of the offset drive countersink apparatus which includes an adjustable offset between the countersink driving tool and the countersink cutting tool.

FIG. 6 is a cross-sectional side view of the countersink cutting tool shown in FIG. 5 taken along the line 6—6 in FIG. 5.

FIG. 7 is a cross-sectional top view of the offset drive countersink apparatus shown in FIG. 5 taken along the line 7—7 of FIG. 5; the adjustable offset is in a first adjustment position.

FIG. 8 is a partial top view of the embodiment of the invention shown in FIG. 7 with the adjustable offset in a second adjustment position.

DESCRIPTION OF THE PREFERRED EMBODIMENT

With reference to the drawings, a new and improved offset drive countersink apparatus embodying the principles and concepts of the present invention will be described.

Figure 2:
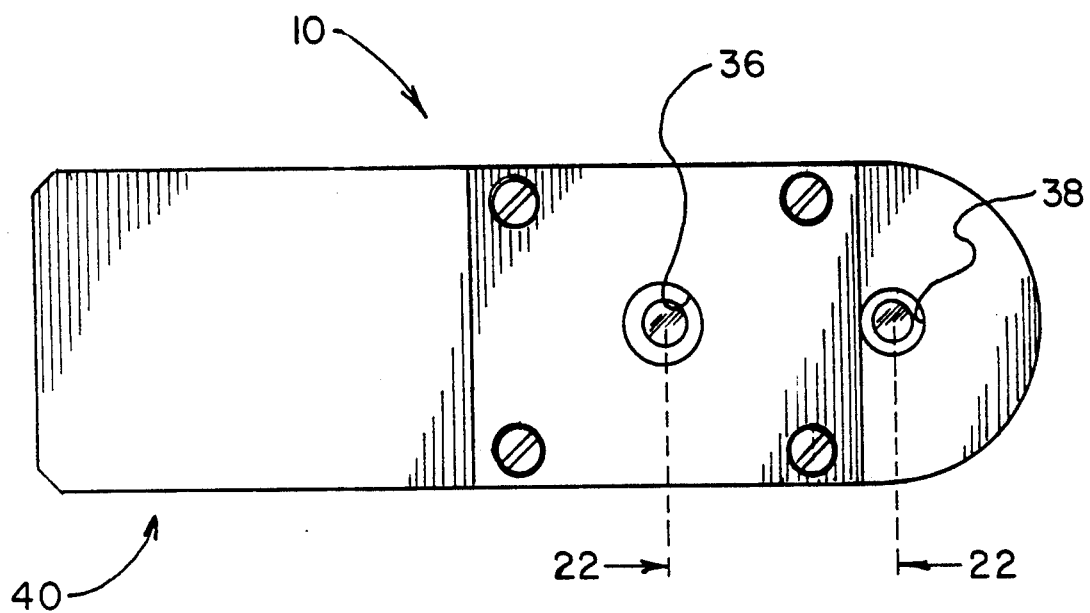
FIG. 2 is a top view of the offset drive countersink apparatus shown in FIG. 1.
Figure 1:
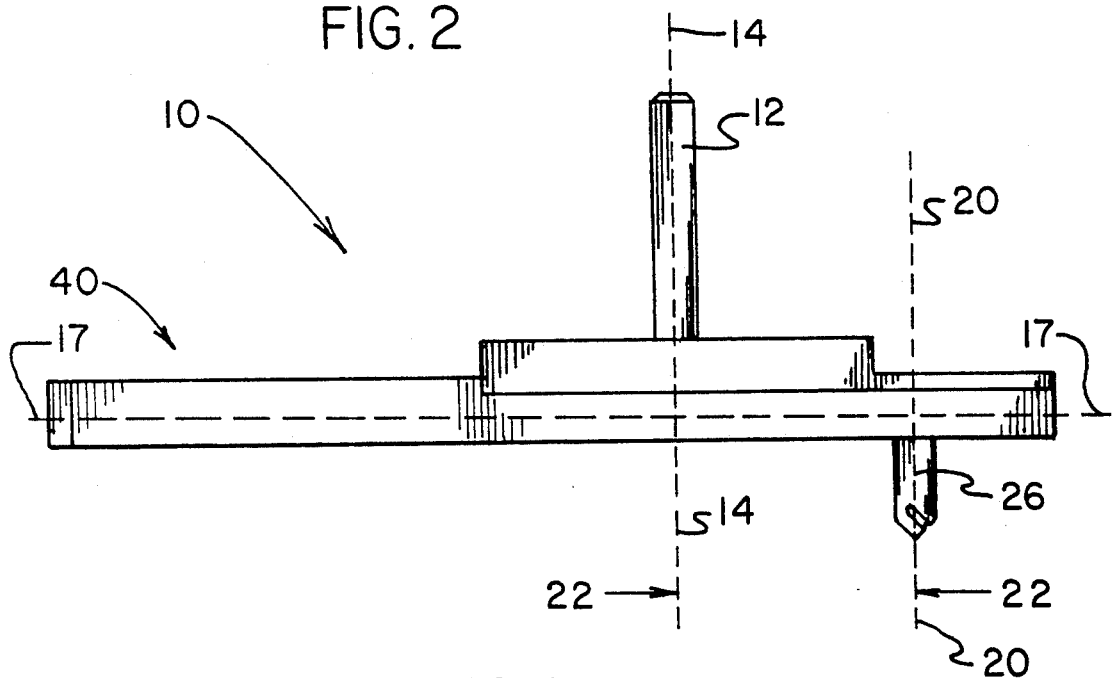
FIG. 1 is a side view showing a first preferred embodiment of the offset drive countersink apparatus of the invention.

Turning initially to FIGS. 1-4, there is shown a first exemplary embodiment of the offset drive countersink apparatus of the invention generally designated by reference numeral 10 for connection to a rotary drive source 11. The apparatus includes a first driven rotating member 12 connected to the rotary drive source 11. The first driven rotating member 12 rotates around a first longitudinal axis 14. A first gear 16 is connected to the first driven rotating member 12. The first gear 16 is driven by the first driven rotating member 12 and rotates around the first longitudinal axis 14. The first gear 16 lies in a first plane 17. A second gear 18 meshes with the first gear 16. The second gear 18 is driven by the first gear 16 and also lies in the first plane 17. The second gear 18 rotates around a second longitudinal axis 20. The first longitudinal axis 14 and the second longitudinal axis 20 are offset from each other by a predetermined offset distance 22 in the first plane 17.

A housing 24 receives the first gear 16 and the second gear 18 and supports the first gear 16 and the second gear 18 in the first plane 17. A countersink tool 26 is connected to the second gear 18. The countersink tool 26 is driven by the second gear 18 and rotates around the second longitudinal axis 20 at the predetermined offset distance 22 offset from the first driven rotating member 12. The housing 24 includes a bottom planar portion 28 that supports the first gear 16 and the second gear 18 in the first plane 17. The bottom planar portion 28 of the housing 24 includes a first bottom alignment aperture 30 for receiving a portion of the first driven rotating member 12 and a second bottom alignment aperture 32 for receiving a portion of the countersink tool 26. The second bottom alignment aperture 32 is offset from the first bottom alignment aperture 30 by the predetermined offset distance 22.

The housing 24 also includes a top planar portion 34 that fits over the first gear 16 and the second gear 18 located in the first plane 17. The bottom planar portion 28 and the top planar portion 34 of the housing 24 are connected together with screws 19. Apertures 21 in the top planar portion 34 receive the screws 19. Threaded holes 23 are present in the bottom planar portion 28 for receiving the screws 19 which are passed through the apertures 21 in the top planar portion 34. The top planar portion 34 includes a first top alignment aperture 36 for receiving a portion of the first driven rotating member 12, a second top alignment aperture 38 for receiving a portion of the countersink tool 26. The second top alignment aperture 38 is offset from the first top alignment aperture 36 by the predetermined offset distance 22.

The following elements are in alignment when the top planar portion 34 is placed upon the bottom planar portion 28 with the first gear 16 and the second gear 18 retained in the first plane 17 within the housing 24: the first driven rotating member 12, the first gear 16, the first top alignment aperture 36, the first gear 16, and the first bottom alignment aperture 30.

In addition, the following elements are also in alignment when the top planar portion 34 is placed upon the bottom planar portion 28 with the first gear 16 and the second gear 18 retained in the first plane 17 within the housing 24: the second top alignment aperture 38, the countersink tool 26, the second gear 18, and the second bottom alignment aperture 32.

As shown in FIG. 4, an extension element 13 may be used for connecting between the first driven rotating member 12 and the rotary drive source 11. In this respect, the extension element 13 may be regarded a rotary drive source 11. The ultimate source of rotary drive may be an electric drill, a milling machine or the like.

A stabilizer 40 is connected to the housing 24 for stabilizing the alignment between the first driven rotating member 12, the countersink tool 26, and a workpiece (not shown). The stabilizer 40 includes an extension portion 42 extending laterally from a side of the housing 24. The stabilizer 40 also includes a tapped well 44, located in the extension portion 42, for connecting with a stabilizing fixture (not shown) extraneous to the extension portion 42.

Turning to FIGS. 5-8, a second embodiment of the invention is shown. Reference numerals are shown that correspond to like reference numerals that designate like elements shown in the other figures. In addition, an offset adjustment assembly for variably adjusting the predetermined offset distance 22 between the first driven rotating member 12 and the countersink tool 26. The offset adjustment assembly includes a first adjustment slot 48 located in the top planar portion 34 of the housing 24. The first adjustment slot 48 encompasses a respective portion of the countersink tool 26. A second adjustment slot 50 is located in the bottom planar portion 28 of the housing 24. The second adjustment slot 50 encompasses a respective portion of the countersink tool 26. The first adjustment slot 48 and the second adjustment slot 50 are in registration when the top planar portion 34 of the housing 24 is connected to the bottom planar portion 28 of the housing 24.

A flexible drive member 52, e.g. a chain, is connected between the first gear 16 and the second gear 18, such that the first gear 16 drives the second gear 18 through the flexible drive member 52. A manually operated flexible-drive-member-tensioning assembly 54 is connected to the housing 24 for selectively adjusting tension on the flexible drive member 52, such that by increasing tension on the flexible drive member 52, as shown in FIG. 8, respective portions of the countersink tool 26 move toward the first driven rotating member 12 inside the respective first adjustment slot 48 and the respective second adjustment slot 50, such that the predetermined offset distance 22 between the first driven rotating member 12 and the countersink tool 26 is decreased, and such that by decreasing tension on the flexible drive member 52, as shown in FIG. 7, respective portions of the countersink tool 26 move away from the first driven rotating member 12 inside the respective first adjustment slot 48 and the respective second adjustment slot 50, such that the predetermined offset distance 22 between the first driven rotating member 12 and the countersink tool 26 is increased.

The flexible-drive-member-tensioning assembly 54 includes a lever which includes a manual adjustment arm 58 and a tensioning arm 60. The flexible-drive-member-tensioning assembly 54 also includes a pivoted fulcrum 62 for the lever. The pivoted fulcrum 62 divides the lever into the manual adjustment arm 58 and the tensioning arm 60. The pivoted fulcrum 62 is connected to the housing 24. A tension exerting element 64 is connected to the tensioning arm 60 for exerting tension on the flexible drive member 52. A locking element 66, located on the housing 24, is used for locking the lever into a manually selected tensioning position.

In operation, when the manual adjustment arm 58 is positioned in the position shown in FIG. 7, the tension exerting element 64 is not exerting tension on the flexible drive member 52. Therefore, the predetermined offset distance 22 between the first driven rotating member 12 and the countersink tool 26 is at a maximum.

On the other hand, when the manual adjustment arm 58 is positioned in the position shown in FIG. 8, the tension exerting element 64 is exerting tension on the flexible drive member 52. In response to this tension, the flexible drive member 52 is pulled outward, and the second gear 18, along with the countersink tool 26 is pulled toward the first gear 16 and the first driven rotating member 12 in the respective slots 48 and 50, whereby the predetermined offset distance 22a in FIG. 8 is less than the predetermined offset distance 22 shown in FIG. 7.

An idler gear 68 is located in the housing 24 and lies in the first plane 17. The idler gear 68 is driven by the flexible drive member 52. The idler gear 68 is located distal to the first gear 16 and the second gear 18. A third adjustment slot 70 is located in the top planar portion 34 of the housing 24. The third adjustment slot 70 encompasses a respective portion of the countersink tool 26. A fourth adjustment slot 72 is located in the bottom planar portion 28 of the housing 24. The fourth adjustment slot 72 encompasses a respective portion of the countersink tool 26. The third adjustment slot 70 and the fourth adjustment slot 72 are in registration when the top planar portion 34 of the housing 24 is connected to the bottom planar portion 28 of the housing 24.

As shown in FIG. 6, the countersink tool 26 is connected to the second gear 18 with bearings 74. The countersink tool 26 can readily be removed from the second gear 18 and replaced with a new countersink tool 26 by removing the countersink tool 26 from the bearings 74.

The components of the offset drive countersink apparatus of the invention can be made from inexpensive and durable metal materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved offset drive countersink apparatus that is low in cost, relatively simple in design and operation, and which provides an offset drive countersink apparatus which does not require the countersink tool to rotate around the same longitudinal axis that the countersink tool driving device rotates around. With the invention, an offset drive countersink apparatus is provided which includes a countersink tool that rotates around a longitudinal axis that is offset from the longitudinal axis that the countersink driving tool rotates around. With the invention, an offset drive countersink apparatus is provided in which the vertical distance between the countersink driving tool and the countersink cutting tool is relatively small. With the invention, an offset drive countersink apparatus is provided which includes provisions for maintaining proper alignment between the countersink driving tool and the offset countersink cutting tool. With the invention, an offset drive countersink apparatus is provided which has provisions for stabilizing the alignment between the countersink driving tool, the countersink cutting tool, and the workpiece. With the invention, an offset drive countersink apparatus is provided that has an adjustable offset. With the invention, an offset drive countersink apparatus is provided in which an offset countersink cutting device has an easily replaced countersink cutting tool.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved offset drive countersink apparatus for connection to a rotary drive source, said apparatus comprising:
    a first driven rotating member for connecting to the rotary drive source, said first driven rotating member rotating around a first longitudinal axis,
    a first gear connected to said first driven rotating member, said first gear driven by said first driven rotating member and rotating around said first longitudinal axis, and said first gear lying in a first plane,
    a second gear meshed with said first gear, said second gear driven by said first gear and lying in said first plane, said second gear rotating around a second longitudinal axis, wherein said first longitudinal axis and said second longitudinal axis are offset from each other by a predetermined offset distance in said first plane,
    a housing receiving said first gear and said second gear and supporting said first gear and said second gear in said first plane,
    a countersink tool connected to said second gear, said countersink tool driven by said second gear and rotating around said second longitudinal axis at said predetermined offset distance offset from said first driven rotating member, and
    wherein said countersink tool is connected to said second gear with bearings.

2. The apparatus described in claim 1 wherein said housing includes a bottom planar portion that supports said first gear and said second gear in said first plane.

3. The apparatus described in claim 2 wherein said bottom planar portion of said housing includes:
    a first bottom alignment aperture for receiving a portion of said first driven rotating member,
    a second bottom alignment aperture for receiving a portion of said countersink tool, said second bottom alignment aperture being offset from said first bottom alignment aperture by said predetermined offset distance.

4. The apparatus described in claim 2 wherein said housing includes a top planar portion which fits over said first gear and said second gear in said first plane and is connected to said bottom planar portion.

5. The apparatus described in claim 4 wherein said top planar portion includes:
    a first top alignment aperture for receiving a portion of said first driven rotating member,
    a second top alignment aperture for receiving a portion of said countersink tool, said second top alignment aperture being offset from said first top alignment aperture by said predetermined offset distance.

6. The apparatus described in claim 5 wherein the following elements are in alignment when said top planar portion is placed upon said bottom planar portion with said first gear and said second gear retained in said first plane within said housing: said first driven rotating member, said first top alignment aperture, said first gear, and said first bottom alignment aperture.

7. The apparatus described in claim 5 wherein the following elements are in alignment when said top planar portion is placed upon said bottom planar portion with said first gear and said second gear retained in said first plane within said housing: said second top alignment aperture, said countersink tool, said second gear, and said second bottom alignment aperture.

8. The apparatus described in claim 1, further including:
    stabilizer means, connected to said housing, for stabilizing alignment between said first driven rotating member, said countersink tool, and a workpiece.

9. The apparatus described in claim 8 wherein said stabilizer means include:
    an extension portion extending laterally from a side of said housing, and
    a tapped well, located in said extension portion, for connecting with a stabilizing element extraneous to said extension portion.

* * * * *